March 10, 1970     J. PAUSCH     3,499,268
MEANS FOR CLEANING DUST SEPARATING APPARATUS
Filed July 12, 1968
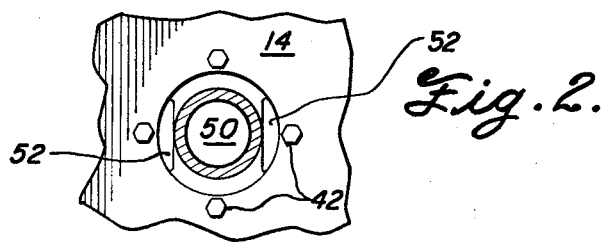
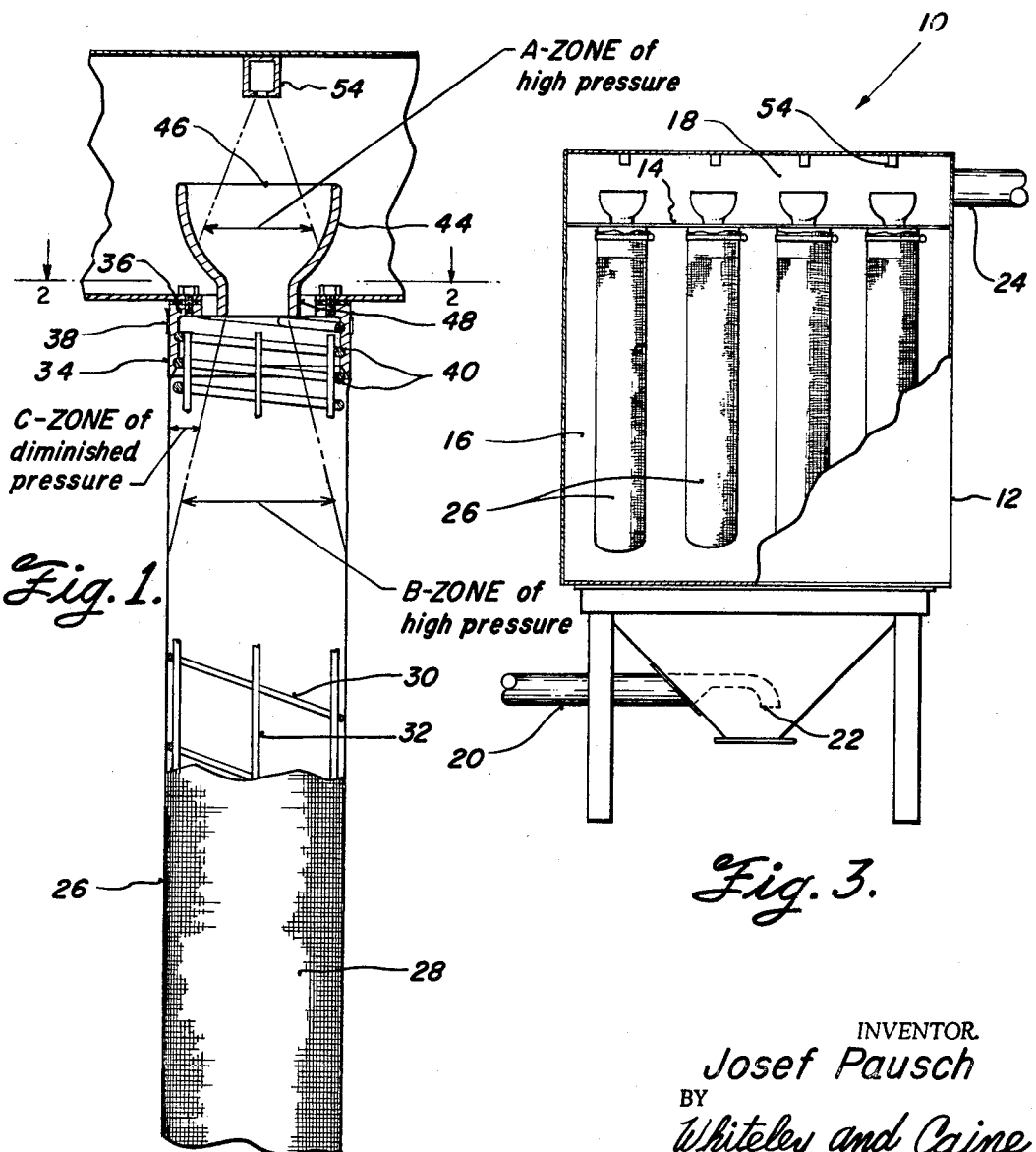
INVENTOR.
Josef Pausch
BY
Whiteley and Caine
ATTORNEYS

United States Patent Office 3,499,268
Patented Mar. 10, 1970

3,499,268
MEANS FOR CLEANING DUST SEPARATING
APPARATUS
Josef Pausch, Hopkins, Minn., assignor to Aerodyne
Machinery Corporation, Hopkins, Minn.
Continuation-in-part of application Ser. No. 658,111,
Aug. 3, 1967. This application July 12, 1968, Ser. No.
744,391
Int. Cl. B01d 46/04, 41/00
U.S. Cl. 55—302                                    1 Claim

ABSTRACT OF THE DISCLOSURE

An apparatus for removal of dust accumulated on the outer surface of a tubular porous filter element including means to release high energy gas into a tubular element, the intake end of which is formed on an outwardly curved radius constituting a "bowl-shaped" portion that connects with a restricted passage and which extends into one end of the filter element, the effect of said tubular element being to induce additional ambient air into the stream to attain considerable pressure within the filter element.

---

This application is a continuation-in-part of my application Ser. No. 658,111 filed Aug. 3, 1967 now abandoned in favor of this application.

This invention relates to improvements in the separation of dust from a mixture with a gas, such as air. In general, the invention is concerned with the discharge of an accumulation of dust from a surface of a porous filtering element by backwashing the element with clean gas in such a manner as to efficiently remove the accumulated solids.

In the prior art there have been other arrangements for discharging accumulated dust from porous filter elements by backwashing with clean gas. One method, disclosed in my application Ser. No. 710,394 now U.S. Patent 3,436,899, is to inject into the interior of a porous flexible tube a high energy gas, which has been accelerated to a supersonic rate, and thereby form waves or vibrations in the flexible surface to discharge the accumulated solids. Other and older methods included the discharge of the high energy gas from a venturi type diffuser across the top of the open porous cylindrical filter element.

In the present invention, the high energy gas is introduced into an injector whose outer open end is formed on an outwardly curved "bowl-shaped" portion that joins a passage of smaller diameter so as to induce some ambient air into the column of high energy gas, and project the combined gases with considerable force into the interior of the filter element to form therein a zone of high pressure, which zone is at least partially surrounded by a zone of lower pressure, to which latter zone, additional air or gas may be induced through other passages that are independent of the main or central passage.

It is an object of the present invention to provide an improved means for discharging accumulated dust from a porous tubular filtering element by injecting high energy gas through a passage, a portion of which contains an outwardly curved section that connects with a narrower portion to induce a larger volume of air under considerable pressure into the interior of the porous filter element.

Another object is to utilize the aforementioned principle, in conjunction with additional passages for inducing additional air into the interior of the porous member, but initially independent of the main body of air.

A further object is to provide apparatus to be used in conjunction with a dust separating system which embodies the use of a tubular injector composed of a large intake opening that is formed on an outwardly shaped curve, forming a structure that is "bowl-shaped," and which extends to a relatively narrow passage, so that when a high energy gas is projected into said intake in the form of a cone whose periphery contacts the inner curved surface above the restricted portion, such action tends to induce ambient gas into the rapidly moving stream, which is then compressed as it passes through the narrower passage, and thereby imparts additional pressure on the combined gases that are projected from the injector into the interior of the filter element to aid in discharging solids accumulated on the outer surface of said filter element.

Other and further objects and advantages of the present invention may become apparent from the following specification and claim, and in the appended drawings in which:

FIG. 1 is a vertical section of an improved part of a dust filtering apparatus forming the present invention;

FIG. 2 is a plan view taken on the line 2—2 of the structure shown in FIG. 1;

FIG. 3 is a sectional view through a chamber of a dust filtering apparatus in which the present invention is embodied.

Referring now to the several figures of the drawing, the invention will be described in detail.

Referring to FIG. 3, general reference numeral 10 indicates in its entirety a form of apparatus used to separate dust from a mixture of dust and air. Reference character 12 indicates a casing that is enclosed on all sides. The casing 12 contains a barrier 14 that divides the internal area of the casing into a lower dust-air receiving chamber 16, and an upper clean-air chamber 18. The air-dust mixture to be separated is conducted into the casing 12 by conduit 20 that projects downwardly to an enlarged outlet opening 22. The clean air chamber 18 has projecting therefrom a discharge duct 24, and while not shown, said duct is connected to the inlet side of a fan or blower, not shown, that has the effect of drawing air from the structure 10.

Disposed within the interior of the dust-air receiving chamber 16 are a plurality of filtering elements 26. The elements 26 are each composed of a flexible fabric bag or "sock" 28 that is supported on a frame composed of a wire coil 30 that has vertical reinforcing ribs 32. The flexible bag 28 is open at its upper end and said end circumscribes a cylindrical member 34 that depends from a plate 36. The bag 28 is secured to the member 34 by a flexible band 38. The upper end of the coil 30 is disposed within a threaded portion 40 located on the interior of the cylindrical member 34. The threaded connection between the wire frame and the cylindrical member 34 makes for a rigid, but detachable connection, and the securing of the flexible bag 28 by the band 38 permits quick replacement of the bag, and also permits the bag to be rotatably moved with respect to the remainder of the structure, and thus produces a greater life for the bag. The plate 36 is secured to the barrier 14 by a series of threaded bolts 42.

Extending upwardly from the plate 36 is a tubular member or injector 44. The upper or intake end 46 of said member is formed with a large diameter portion that is formed on an outwardly curved radius to give a "bowl-shaped" appearance to the member. Said portion tapers inwardly to a lower or discharge end 48 of smaller diameter that is secured to the plate 36 to project through an opening 50 into the interior of the filter element 26. On either side of the member 44, as seen in FIG. 2, are a pair of openings 52 in the plate 36 which form independent communication between the clean air chamber 18 and the interior of the filtering element 26. Disposed centrally above the member 44 is a jet or outlet 54 for high energy gas, such as compressed air that is derived from a source, not shown. As will be seen in FIG. 3, each of the filtering elements 26 is provided with an individual member 44, and each of these latter elements is disposed beneath an individual high energy gas jet or outlet 54.

The operation of the invention will now be described.

It is assumed that the outlet 24 from the container 12 is connetced to the intake or low pressure side of a blower adapted to create a negative pressure within the clean air portion 18 of the device 10. Dust-laden gas from some source would pass through conduit 20 and enter the space 16. The incoming mixture of gas and solids is projected downwardly toward the lower outlet of casing 12 to produce some separation, and also aid in preventing a build-up of solids. However, the dust-laden gas will be drawn towards the filter elements 26, by reason of the lower pressure within said elements, and dust or solid particles will collect on the outer surface of the fabric elements 28, with the filtered air or gas passing outwardly through member 44, and through the independent passages 52 into the clean air space 18, and thence passing outwardly through conduit 24. As the dust layer, which adheres to the outer surface of each of the filter elements 26 increases, the rate of filtration is reduced, and therefore, it is necessary, from time to time, to restore the efficiency of the system by discharging the accumulated dust from the outer surface of each of the elements 26. To accomplish this, a high energy gas, such as air, compressed to a pressure of about 100 p.s.i. is emitted by control means, not shown, through an outlet 54, passing into the intake end 46 of the injector 44. The compressed gas forms a cone of dispersion, designated in the drawings as A, which approximates about 40 degrees, the periphery of which contacts the interior of the bowl-shaped member 44 at a point more or less midway between the upper open end 46, and the lower restricted passage 48. This action tends to induce a certain amount of the ambient gas into the upper open end of member 44 to mix with the high energy gas, so that the total body of gas passing under substantial pressure tends to be compressed as it passes through the lower open end 48, forming a second cone-shaped zone of high pressure, indicated by reference character B within the interior of member 26. The cone-shaped zone B is surrounded by a zone of diminished pressure, indicated at C, which is in communication with the openings 52 in plate 36 of the member 44, so that each of said openings 52 tend to induce additional ambient gas into the upper portion of the interior of member 26. The combination of gases that are injected or induced into the interior of the element 26 will establish a pressure within member 26 that is above the pressure within chamber 16, and therefore, it passes outwardly through the fabric layer 28 to discharge dust from the outer surface of the filtering element. Some of the air may also be vented through the auxiliary openings 52 in the plate 36.

The principal advantage of the present invention is that it increases the efficiency of the dust filtering system by making the entire length of each filter tube fully effective, without having to sacrifice other beneficial factors. Moreover, the outwardly sloping curvature of the "bowl-shaped" member 44 tends to induce a larger amount of air through the member 44 so as to provide increased pressure within the interior of the filtering element, and discharge accumulated dust from the outer surface thereof. These factors are important advantages in discharging solids accumulated on the outer surfaces of the filter elements. Thus, a further advantage is that a greater pressure of cleaning gas can be provided throughout the entirety of the porous elements than has been obtainable heretofore.

The invention is defined in the appended claim.

I claim:

1. In apparatus for filtering solid particles from gases, embodying:
  a porous flexible filtering tube formed with an open outlet end for filtered gas and closed at the other end;
  an enclosure containing said tube;
  dividing means within said enclosure separating the interior thereof into an inlet portion and a outlet portion, and having an opening therein, said tube having its open outlet end carried by said dividing means adjacent said opening;
  inlet means connected to said inlet portion of said enclosure;
  outlet means connected to said outlet portion of said enclosure;
  a source of compressed gas;
  the improvements of a member extending through said outlet portion and through said opening in said dividing means and in axial alignment with said filtering tube, said member containing a passage composed of a bowl-shaped inlet portion formed with its wall convexly outwardly curved relative to the interior of said member and leading to an outlet portion of substantially constant cross-sectional area that is substantially less than the cross-sectional area of said filtering tube;
  means for discharging said compressed gas into said bowl-shaped inlet portion of said member under sufficient pressure to induce ambient gas to intermix therewith in said passage of said member and pass therethrough into the interior of said filtering tube;
  and means forming at least one gas passage which is independent of said member passage and connects the interior of said outlet end of said filtering tube with said outlet portion of said enclosure and adapted to provide a path for gas flow in alternate directions, either into or out of said filtering tube when said compressed gas is passing through said member passage and into the interior of said filtering tube.

References Cited

UNITED STATES PATENTS

| 1,108,247 | 8/1914  | Schenck       | 230—92  |
| 2,308,365 | 1/1943  | Hornbrook     | 55—341  |
| 2,352,792 | 7/1944  | Kuster et al. | 230—95  |
| 2,779,433 | 1/1957  | Winslow       | 55—293  |
| 2,819,800 | 1/1958  | Goodloe       | 210—323 |
| 2,862,622 | 12/1958 | Kircher et al.| 55—341  |
| 3,045,897 | 7/1962  | Wood          | 230—92  |
| 3,394,532 | 7/1968  | Oetiker       | 55—302  |
| 3,394,815 | 7/1968  | Harms et al.  | 210—323 |
| 2,546,558 | 3/1951  | Niederkorn    | 55—461  |

FOREIGN PATENTS

| 225,059 | 10/1959 | Australia. |
| 700,483 | 12/1964 | Canada. |
| 908,630 | 10/1945 | France. |
| 411,960 | 6/1934  | Great Britain. |

OTHER REFERENCES

Mikro-Pulsaire Collector Bulletin 52A-3, Pulverizing Machinery Div. of Slick Industrial Co., pages 1–10, dated November 1964.

HARRY B. THORNTON, Primary Examiner

BERNARD NOZICK, Assistant Examiner

U.S. Cl. X.R.

55—341, 468